(12) United States Patent
Yanagida et al.

(10) Patent No.: US 11,121,433 B2
(45) Date of Patent: Sep. 14, 2021

(54) WIRING MODULE AND POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Taiji Yanagida, Mie (JP); Shinichi Takase, Mie (JP); Yasuhiko Kotera, Mie (JP); Yoshiaki Kuroyanagi, Mie (JP); Koichi Tanaka, Aichi-ken (JP)

(73) Assignees: AUTONETWORKS TECHNOLOGIES, LTD., Mie (JP); SUMITOMO WIRING SYSTEMS. LTD., Mie (JP); SUMITOMO ELECTRIC INDUSTRIES. LTD., Osaka (JP); TOYOTA JIDOSHA KABUSHIK KAISHA, Aichi-ken (JP)

( * ) Notice: Subject to any disclaimer, the term of this patent is extended or adjusted under 35 U.S.C. 154(b) by 250 days.

(21) Appl. No.: 16/248,382

(22) Filed: Jan. 15, 2019

(65) Prior Publication Data

US 2019/0221816 A1    Jul. 18, 2019

(30) Foreign Application Priority Data

Jan. 16, 2018   (JP) .............................. JP2018-004940

(51) Int. Cl.
*H01M 50/502*   (2021.01)
*H01R 25/00*    (2006.01)
(Continued)

(52) U.S. Cl.
CPC ............. *H01M 50/502* (2021.01); *B60K 1/04* (2013.01); *B60R 16/033* (2013.01);
(Continued)

(58) Field of Classification Search
CPC ........... H01M 2220/20; H01M 2/1072; H01M 2/206; B60K 1/04; B60R 16/033; H01R 25/003; Y02E 60/10
See application file for complete search history.

(56) References Cited

U.S. PATENT DOCUMENTS 9,252,410 B2   2/2016  Kosaki et al.
9,620,761 B2   4/2017  Smith et al.
(Continued)

FOREIGN PATENT DOCUMENTS

CN       106575725      4/2017
CN       107004822      8/2017
(Continued)

*Primary Examiner* — Adam A Arciero
(74) *Attorney, Agent, or Firm* — Greenblum & Bernstein, P.L.C.

(57) ABSTRACT

A wiring module configured to connect a power storage element group including power storage elements to external member includes: a connection member that connects electrodes of a pair of the power storage elements; an insulating protector that is attached to an electrode surface of the power storage element group and that houses the connection member; an electric cable that includes one end to be connected to a terminal electrode of the power storage element group and another end to be connected to the external member, and that is folded back from the one end to the other end; and a holding part that is provided to the insulating protector, and is configured to hold the electric cable.

10 Claims, 10 Drawing Sheets

(51) Int. Cl.
*B60K 1/04* (2019.01)
*B60R 16/033* (2006.01)
*H01M 50/20* (2021.01)

(52) U.S. Cl.
CPC .......... *H01M 50/20* (2021.01); *H01R 25/003* (2013.01); *H01M 2220/20* (2013.01)

(56) References Cited

U.S. PATENT DOCUMENTS

| | | | |
|---|---|---|---|
| 10,333,236 B2 | 6/2019 | Okamoto | |
| 10,490,797 B2 | 11/2019 | Shimizu et al. | |
| 10,727,625 B2 * | 7/2020 | Fukushima | H01M 2/206 |
| 2010/0224403 A1 | 9/2010 | Kosak et al. | |
| 2011/0294000 A1 * | 12/2011 | Kim | H01M 50/20 |
| | | | 429/176 |
| 2013/0196533 A1 | 8/2013 | Ogasawara et al. | |
| 2015/0285839 A1 * | 10/2015 | Merriman | H01M 10/4207 |
| | | | 429/90 |
| 2015/0357609 A1 * | 12/2015 | Lang | B60L 50/66 |
| | | | 320/113 |
| 2016/0072112 A1 * | 3/2016 | Smith | H01M 2/202 |
| | | | 429/93 |
| 2017/0263909 A1 | 9/2017 | Shimizu et al. | |
| 2018/0331440 A1 | 11/2018 | Okamoto | |

FOREIGN PATENT DOCUMENTS

| | | |
|---|---|---|
| CN | 107112458 | 8/2017 |
| JP | 2010-211962 A | 9/2010 |
| JP | 2013-157122 | 8/2013 |

* cited by examiner

WIRING MODULE AND POWER STORAGE MODULE

CROSS REFERENCE TO RELATED APPLICATION

This application claims priority from Japanese Patent Application No. 2018-004940 filed on Jan. 16, 2018. The entire contents of the priority application are incorporated herein by reference.

TECHNICAL FIELD

The technology described herein relates to a wiring module and a power storage module.

BACKGROUND

One of conventionally known configurations for electrically connecting a power storage element group where a plurality of power storage elements are arranged to an external member is disclosed in, for example, Japanese Unexamined Patent Application Publication No. 2013-157122. This electric cable connection structure is a power source for a vehicle. In this structure, a plurality of battery groups each including a plurality of batteries in series are connected in a manner that the battery groups are disposed apart from each other. In addition, a thick high-voltage electric cable is extended over the battery groups, and crimp terminals provided to both ends of the high-voltage electric cable are fastened with a bolt to all electrodes disposed at a terminal of the serial connection in each battery group, so that the battery groups are connected to each other.

In this configuration, however, the flexibility of the high-voltage electric cable is low, and while one end side of the high-voltage electric cable is fastened with a bolt to all the electrodes of one battery group, another part of the high-voltage electric cable tends to project to an undesired position to interrupt the work. In order to solve this problem, the high-voltage electric cable is made as short as possible; however, in this case, it is difficult to absorb the tolerance of the gap between the battery groups. In addition, the other end of the high-voltage electric cable may project near all the electrodes to interrupt the work.

SUMMARY

The technology described herein was made in view of the above circumstances. An object is to provide a wiring module and a power storage module, in which the tolerance of the gap between the power storage element group including the power storage elements connected in series, and an external member is absorbed, and the electric cable can be held at a position not interrupting the work in a state before these are connected.

According to the technology described herein, a wiring module configured to connect a power storage element group including a plurality of power storage elements connected in series to an external member includes: a connection member that connects electrodes of a pair of the power storage elements that is adjacent to each other; an insulating protector that is attached to an electrode surface of the power storage element group where each electrode is disposed, and that houses the connection member; an electric cable that includes one end to be connected to a terminal electrode of the power storage element group and another end to be connected to the external member, and that is folded back from the one end to the other end; and a holding part that is provided to the insulating protector, and is configured to hold the electric cable in a state where the other end of the electric cable is inclined toward the power storage element group before the other end of the electric cable is connected to the external member.

In this configuration, the electric cable is folded back from the one end that is connected to the terminal electrode of the power storage element group to the other end that is connected to the external member; therefore, by the folded-back length, the tolerance of the gap between the power storage element group and the external member can be absorbed. In a state before the other end of the electric cable is connected to the external member, the electric cable can be held is a state where the other end is inclined to the power storage element group; therefore, the workability can be improved.

The holding part may include a hook part with a cylindrical shape. The hook part may include an electric cable attachment/detachment port that opens to a side closer to the terminal electrode, and a holding inner wall with an arc shape that surrounds the electric cable. The holding inner wall may include an inverted tapered part on a side away from the power storage element group and the terminal electrode.

In this configuration, the inverted tapered part of the hook part is brought into contact with the electric cable from the side away from the power storage element group and away from the terminal electrode; therefore, the electric cable can be held in a state where the other end of the electric cable is inclined to the power storage element group side and to the terminal electrode side.

The wiring module may further include a connector that is provided to the other end of the electric cable and connected to the external member.

In this configuration, just connecting the connector to the external member at the other end of the electric cable enables the power storage element group to be connected to the external member; thus, the workability is high.

A power storage module according to the technology described herein includes the wiring module that is attached to the electrode surface of the power storage element group; a side plate that covers a side surface adjacent to the electrode surface of the power storage element group; and a fixing member provided to the side plate. The fixing member fixes an intermediate part of the electric cable in a route from the terminal electrode to the holding part.

In addition, in a case where the holding part holds the electric cable in a state where the other end of the electric cable is directed to the power storage element group, the intermediate part of the electric cable in the route from the terminal electrode to the holding part is inclined to a direction relatively away from the power storage element group. On the other hand, in the configuration described above, the intermediate part of the electric cable in the route from the terminal electrode to the holding part is fixed by the fixing member; thus, the intermediate part that will be deviated to the direction away from the power storage element group can be suppressed easily. Accordingly, it is possible to prevent the intermediate part of the electric cable from projecting to the undesired position and the workability can be improved.

The power storage module may further include a conductive plate that extends from an electrode side connection part connected to the terminal electrode in a direction away from the electrode surface along the side plate, and includes an extension end part corresponding to an electric cable side connection part connected to the one end of the electric cable. The external member may be disposed on a side closer to the electrode surface on the side plate.

In this configuration, since the electric cable is bent from the side away from the electrode surface to the side closer to the electrode surface at the side plate, the electric cable can be bent gradually and be disposed.

According to the technology described herein, a wiring module and a power storage module, in which the tolerance of the gap between the power storage element group including the power storage elements connected in series, and the external member is absorbed, and the electric cable can be held at a position not interrupting the work in a state before these are connected can be provided.

DETAILED DESCRIPTION

<Embodiment>

An embodiment according to the technology described herein is described with reference to FIG. 1 to FIG. 10.

A power storage module 1 according to the present embodiment is mounted in a vehicle such as an electric vehicle or a hybrid vehicle, connected to another power storage module, and used as a power source for traveling. In the drawings used in the description below, an X direction indicates a rightward direction, a Y direction indicates a frontward direction, and a Z direction indicates an upward direction. In addition, in the description below, a plurality of members that are the same may be denoted by one reference sign and the reference signs and description of the other members may be omitted.

The power storage module 1 according to the present embodiment includes a power storage element group BU and a wiring module MD. The power storage element group BU includes a plurality of power storage elements BC and a side plate unit 10. The wiring module MD includes a plurality of connection members 60, an insulating protector 20, a conductive plate 40, an electric cable 50, and a connector 70.

Figure 10:
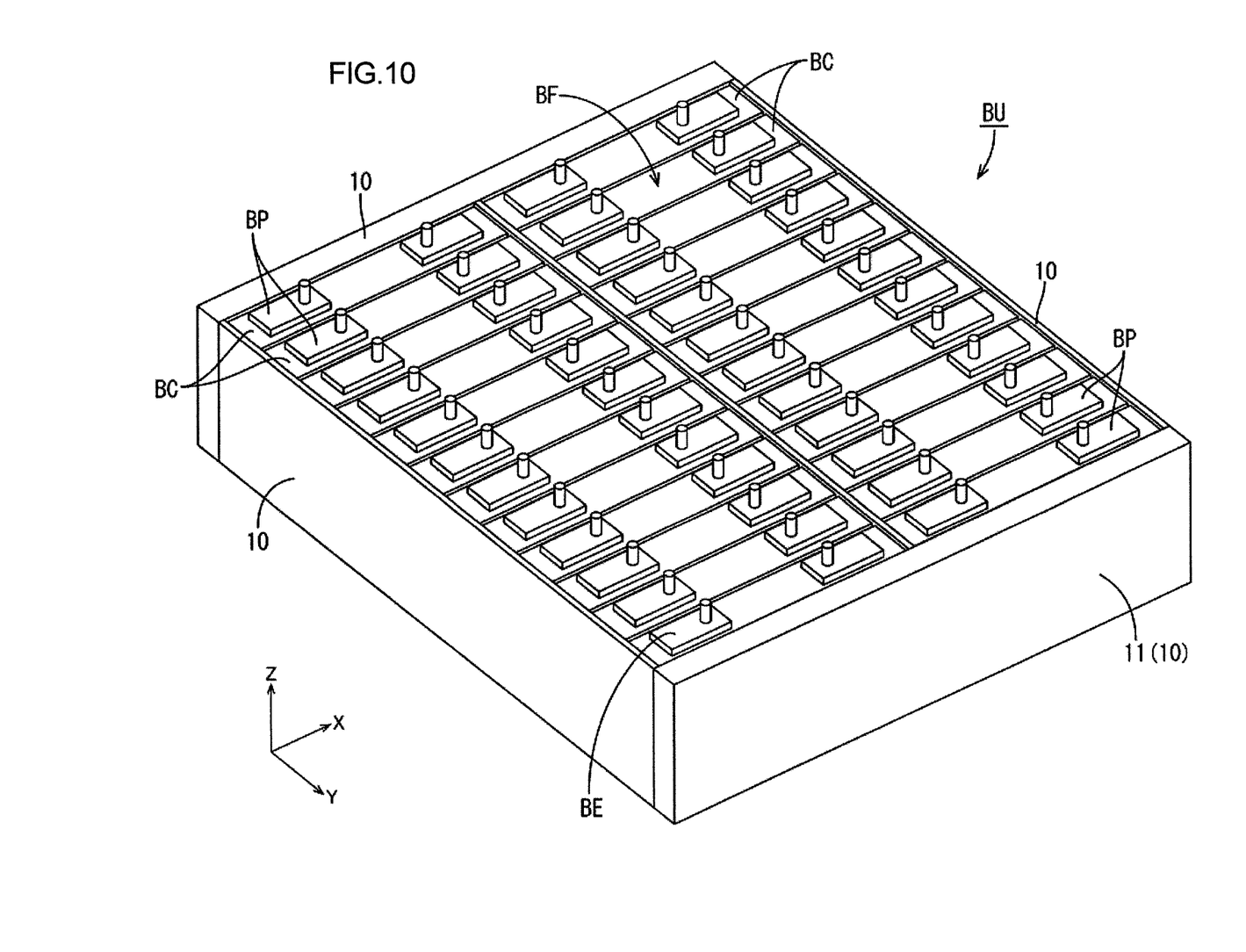
FIG. 10 is a perspective view illustrating a power storage element group.

The power storage element group BU includes, for example, a plurality of power storage elements BC such as lithium ion batteries. The power storage elements BC are arranged in a left-right direction and a front-back direction with electrodes BP facing up as illustrated in FIG. 10. Note that the power storage elements BC that are adjacent to each other in the front-back direction and the left-right direction are connected in series through the connection members 60 to be described below, and thus, the entire power storage element group BU is connected in series. In the power storage element group BU, the electrode BP in the front left array is a terminal electrode BE in the serial connection.

Figure 1:
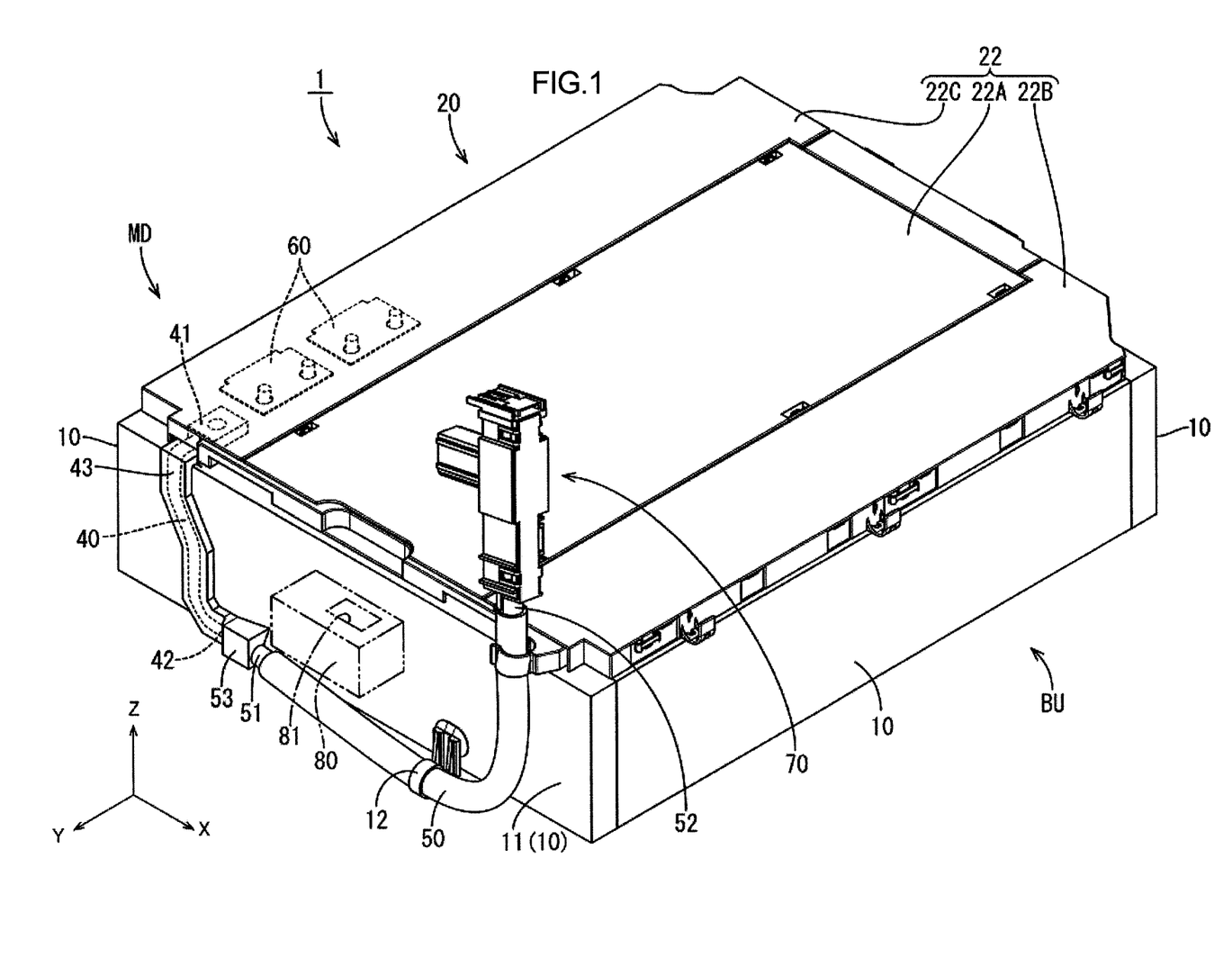
FIG. 1 is a perspective view illustrating a power storage module according to an embodiment.
Figure 2:
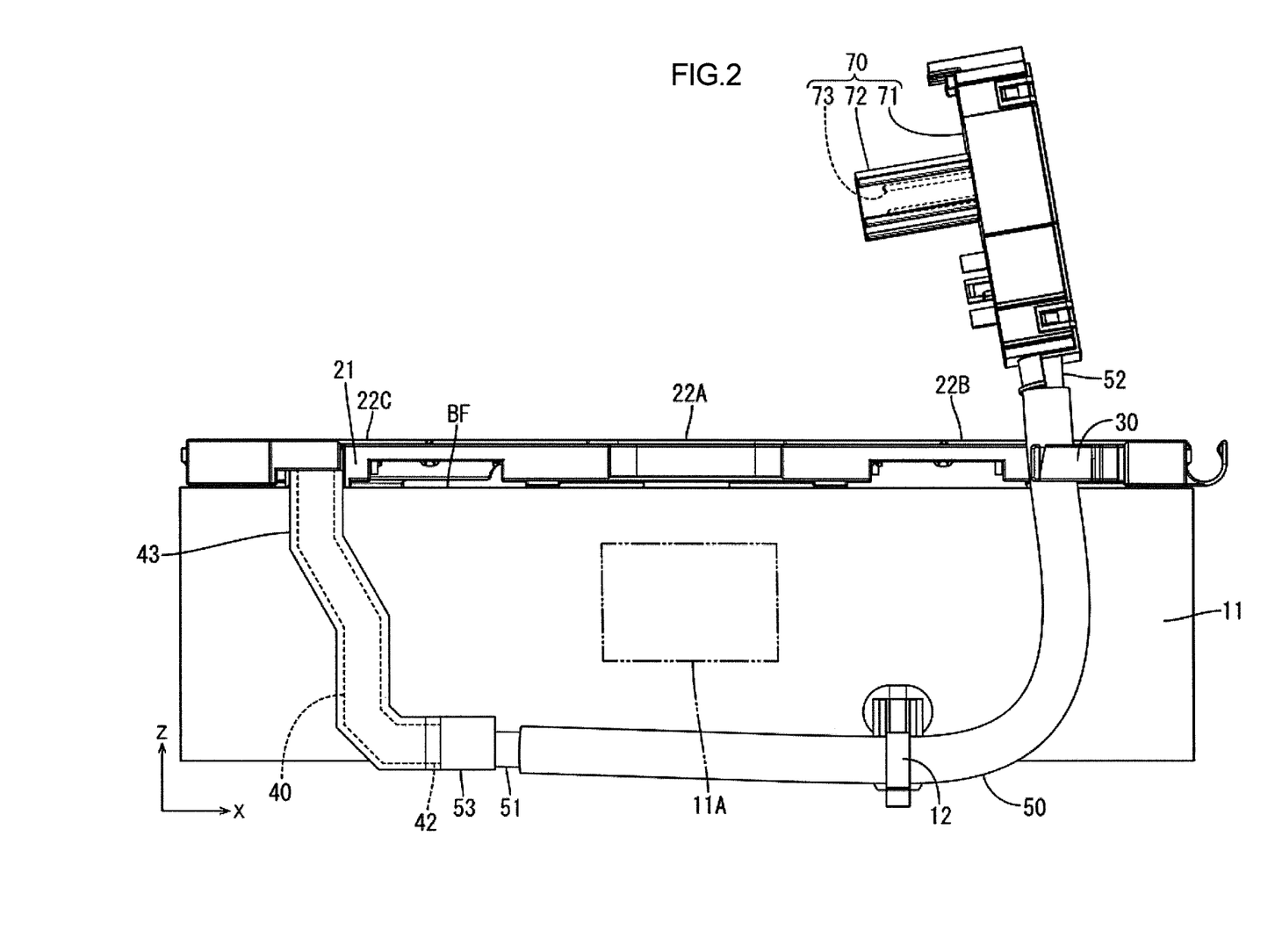
FIG. 2 is a front view illustrating the power storage module.

The side plate unit 10 includes four plate shaped members that cover side surfaces of the power storage element group BU, and has a hollow rectangular parallelepiped shape as a whole as illustrated in FIG. 1. Among the four plate-shaped members, the flat plate-shaped member disposed on the front side of the power storage element group BU is a side plate 11. As illustrated in FIG. 2, a substantially central region of the side plate 11 corresponds to an external member opposite region 11A that is opposed to a connector of another power storage module (hereinafter referred to as counterpart connector 80) (one example of the external member).

Figure 3:
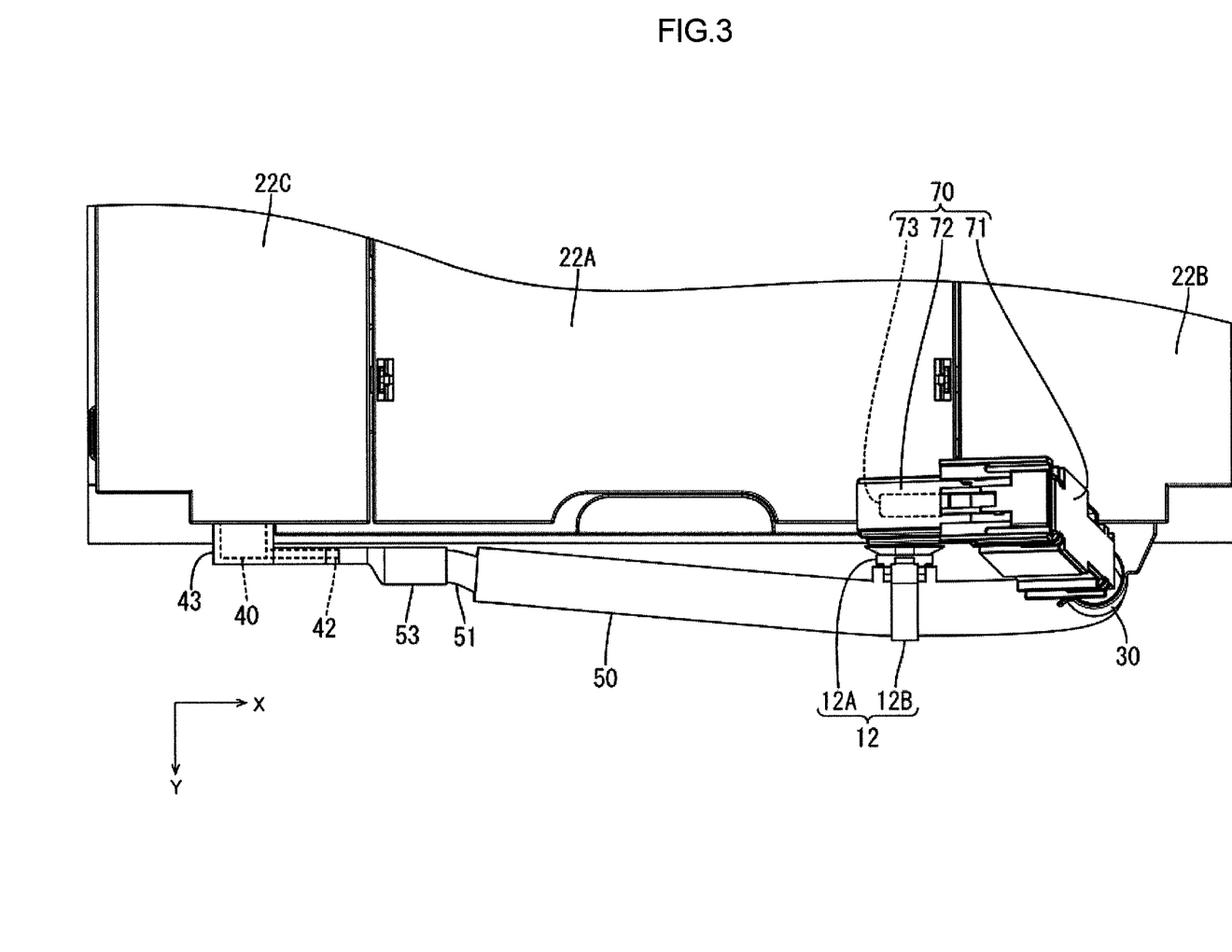
FIG. 3 is a top view illustrating the power storage module.

The side plate 11 is provided with a fixing member 12 that fixes the electric cable 50. The fixing member 12 is disposed on the right side of the external member opposite region 11A, on the left side of a hook part 30 to be described below, and near a lower end of the side plate 11 as illustrated in FIG. 2. The fixing member 12 includes a projection part 12A that projects forward from the side plate 11, and a tie band 12B that is provided to an end of the projection part 12A as illustrated in FIG. 3. The configuration that is provided to the end of the projection part 12A is not limited to the tie band 12B, and may be any configuration having means that can fix the electric cable 50.

The insulating protector 20 is formed of an insulating synthetic resin, and includes a protector main body 21, a protector cover 22, and the hook part 30 as illustrated in FIG. 1.

The protector main body 21 forms a box-like shape that is flat on the upper and lower sides, and is provided to an electrode surface BF where the electrodes BP in the power storage element group BU are arranged. The protector main body 21 includes a plurality of holes (not shown) that penetrates vertically. The protector main body 21 houses the connection member 60 such as a bus bar, and a lower surface of the connection member 60 that is exposed from the hole is in contact with an upper surface of each electrode BP; thus, the electrodes BP are connected to each other.

The protector cover 22 is formed to be integrated with the protector main body 21, and is put on the protector main body 21 to cover the connection member 60. The protector cover 22 includes a first cover 22A that is put on a central part of the protector main body 21, a second cover 22B that is put on a right part thereof, and a third cover 22C that is put on a left part thereof. The first cover 22A is extended between the power storage elements BC that are adjacent to each other in the left-right direction.

Figure 4:
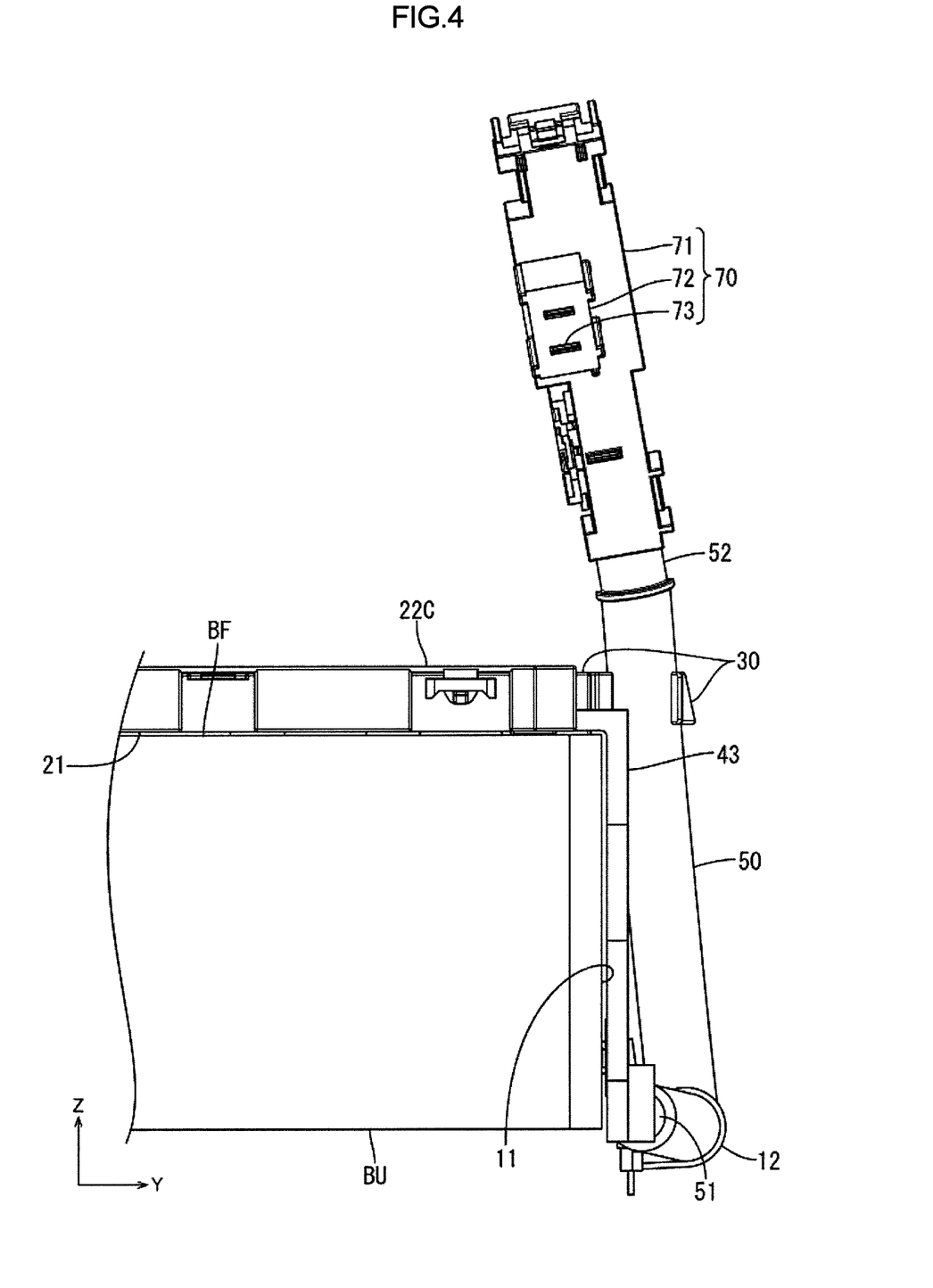
FIG. 4 is a left side view illustrating the power storage module.
Figure 5:
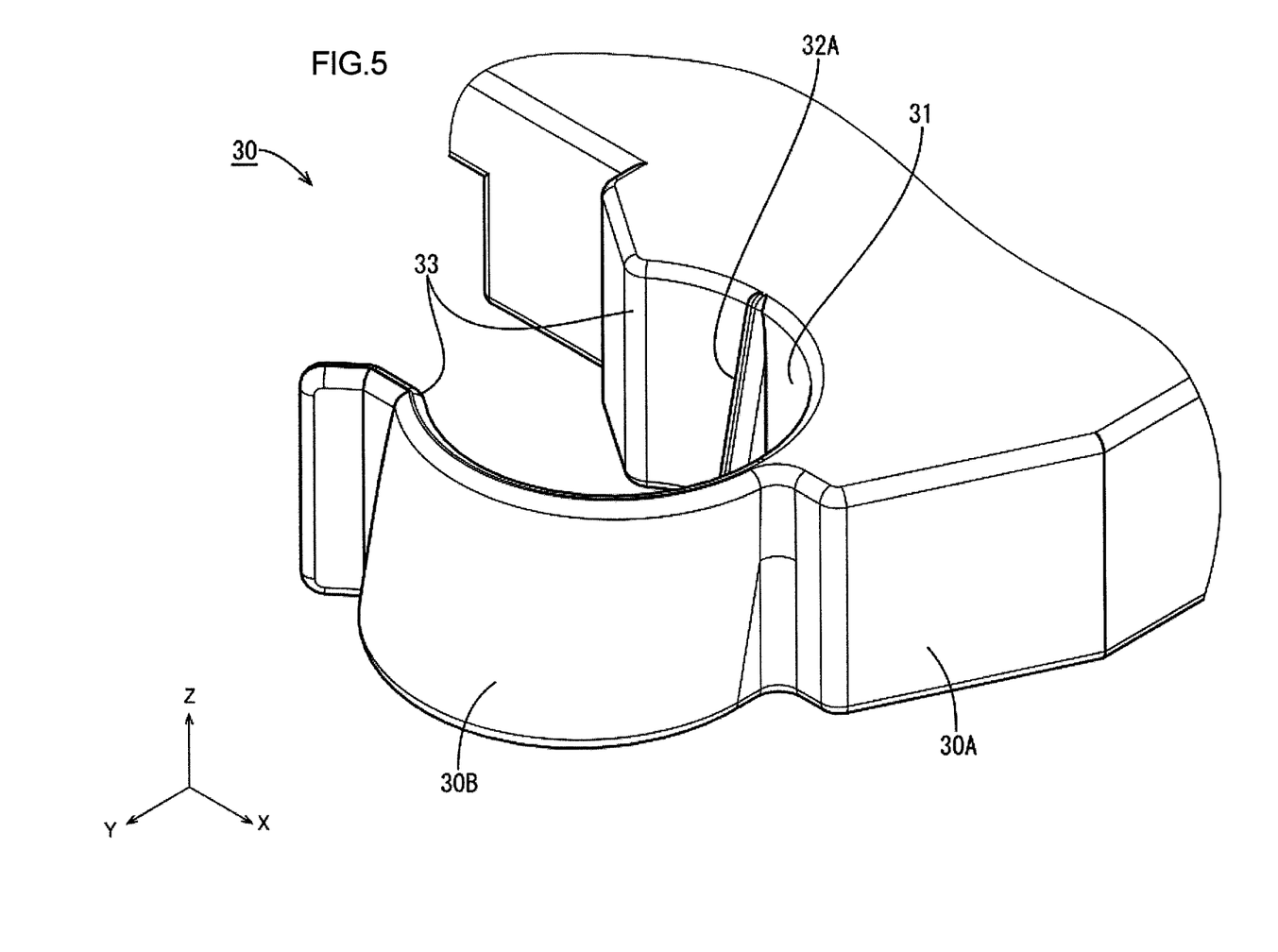
FIG. 5 is a perspective view illustrating a hook part.
Figure 6:
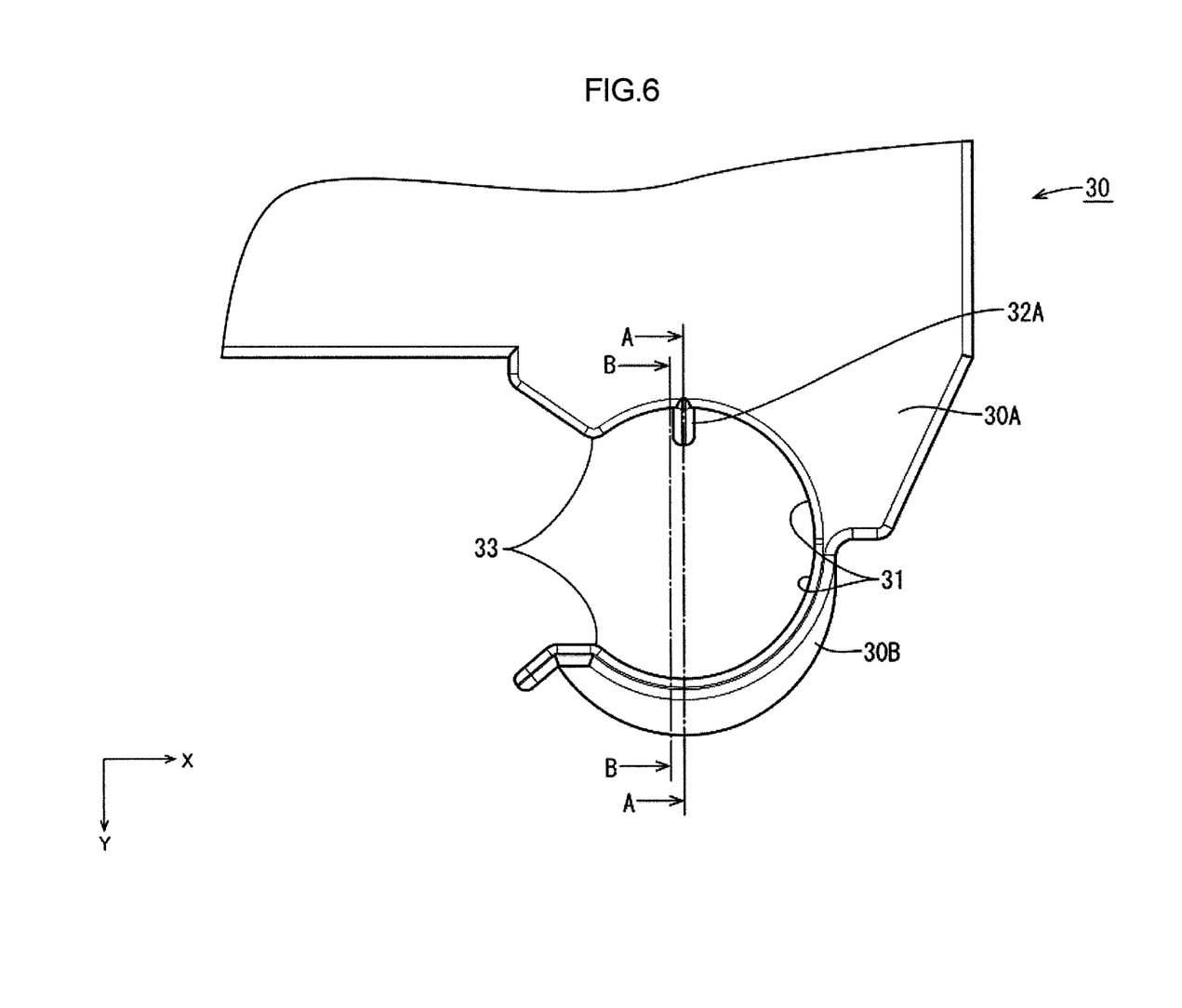
FIG. 6 is a top view illustrating the hook part.

The hook part 30 is provided to project forward from a front end of the protector main body 21 as illustrated in FIG. 2 and FIG. 4. The position of the hook part 30 in the left-right direction is on the left side of a front right corner of the insulating protector 20 and on the right side of the external member opposite region 11A of the side plate 11. The hook part 30 includes a base end part 30A that projects forward from the protector main body 21 and a clasp part 30B that extends in an arc shape from a front end of the base end part 30A as illustrated in FIG. 5 and FIG. 6. With an inner wall of the base end part 30A and an inner wall of the clasp part 30B, a holding inner wall 31 is formed. The holding inner wall 31 is curved in an arc shape as a whole, and has thickness vertically. The holding inner wall 31 has a substantially C-like shape in a plan view, opens to the left side (toward the terminal electrode BE), and opens to both sides vertically. That is to say, the hook part 30 has a cylindrical shape which penetrates vertically and whose left side is cut off. The opening of the holding inner wall 31 on the left side is smaller in diameter than the electric cable 50, and serves as an electric cable attachment/detachment port 33 used for attaching or detaching the electric cable 50 to or from the hook part 30.

Figure 7:
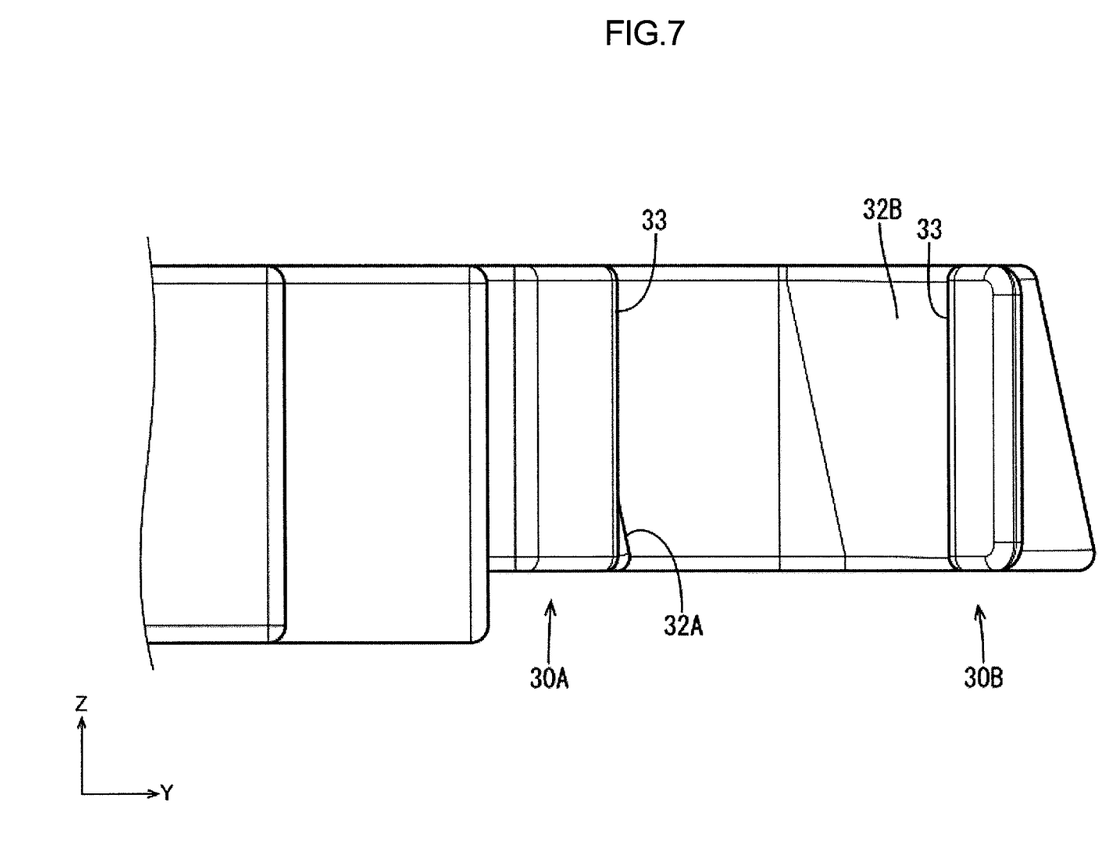
FIG. 7 is a left side view illustrating the hook part.
Figure 8:
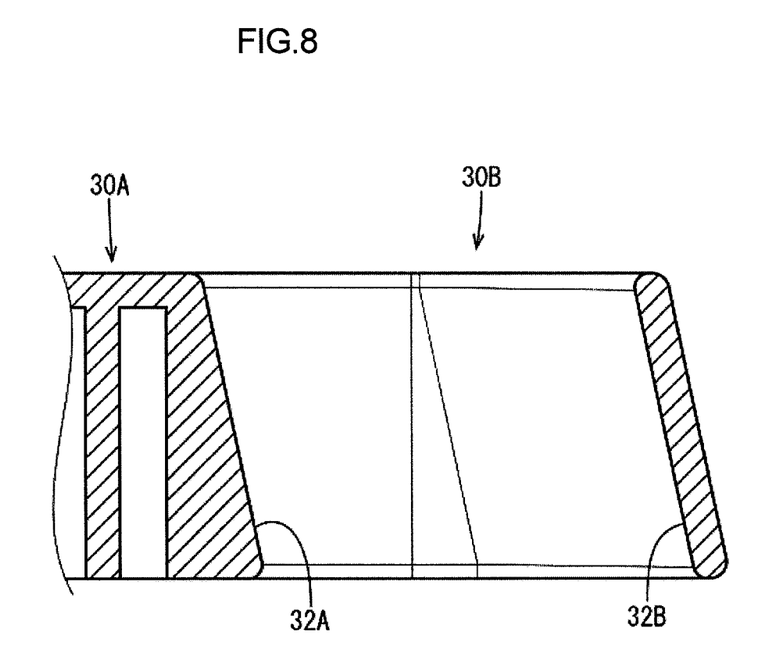
FIG. 8 is a cross-sectional view taken along line A-A in FIG. 6.
Figure 9:
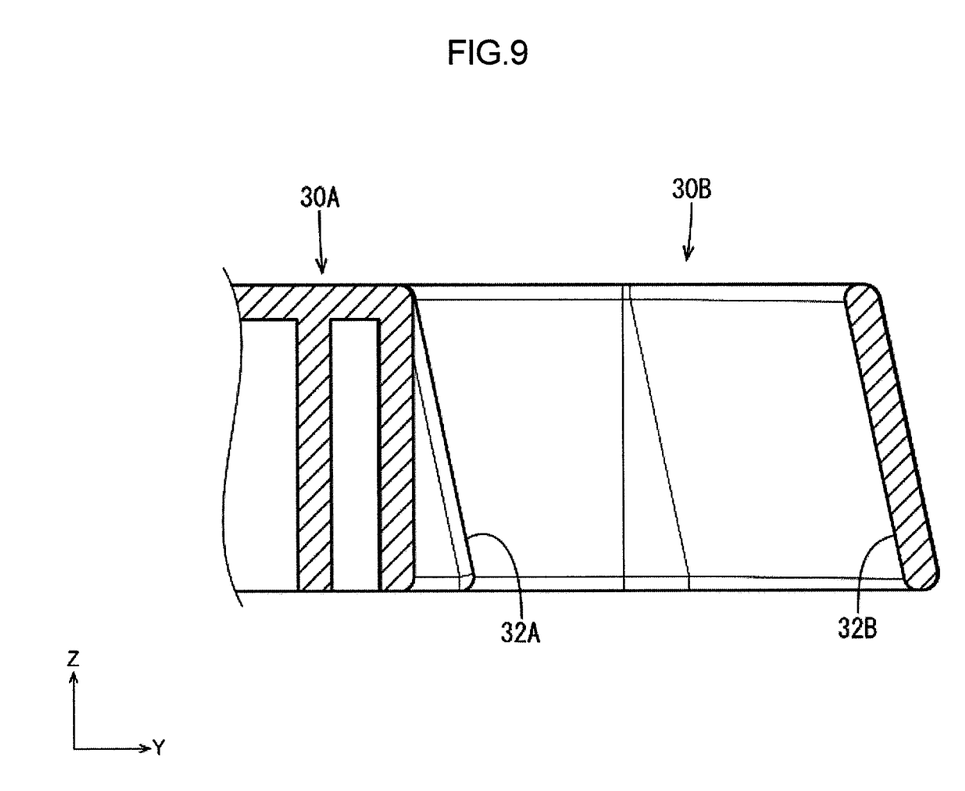
FIG. 9 is a cross-sectional view taken along line B-B in FIG. 6.

Of the holding inner wall 31, the inner wall of the clasp part 30B is provided with an inverted tapered part 32B that is formed to expand downward as illustrated in FIG. 7 to FIG. 9. Specifically, as illustrated in FIG. 6, the arc formed by a lower end of the inverted tapered part 32B is larger in curvature than the arc formed by an upper end of the inverted tapered part 32B, and is more on the front right side than the arc formed by the upper end of the inverted tapered part 32B. That is to say, the axis of the inverted tapered part 32B is inclined upward and a little to the rear left side from the vertical direction.

In addition, of the holding inner wall 31, the inner wall of the base end part 30A is provided with a rib 32A that projects toward the axis of the inverted tapered part 32B. The rib 32A is disposed extending from the upper end to the lower end of the inner wall of the base end part 30A, and has a tapered shape in which its ridge line projects forward gradually from the upper end to the lower end. The ridge line of the rib 32A is parallel to the axial line of the inverted tapered part 32B. The projecting end at the lower end of the rib 32A projects to such a degree that the rib 32A appears from the electric cable attachment/detachment port 33 when viewed from the left as illustrated in FIG. 7. The left and right sides of the ridge line of the rib 32A are provided with a gradual C plane.

The conductive plate 40 is formed to have a band-like shape from a conductive metal plate material with relatively large thickness and high rigidity. As illustrated in FIG. 1 and FIG. 2, the conductive plate 40 is provided in a state where: an electrode side connection part 41 on an upper end is connected to the terminal electrode BE of the power storage element group BU, and extends from the insulating protector 20 to the vicinity of the lower end of the side plate 11 along a region of the side plate 11 on the left side of the external member opposite region 11A; and an electric cable side connection part 42 provided at an extension end part of the conductive plate 40 is directed to the right side. The conductive plate 40 is covered with a conductive cover 43.

The electric cable 50 is a cable formed by covering an electric cable with an insulating protective material, and at one end 51 thereof, a linking member 53 is fixed. The electric cable 50 is connected to the conductive plate 40 in the linking member 53.

The connector 70 includes a connector main body 71, a fitting cylindrical part 72 to be fitted to the counterpart connector 80, and a terminal jig 73 as illustrated in FIG. 2. The connector main body 71 is connected to the other end 52 of the electric cable 50. The fitting cylindrical part 72 projects from the connector main body 71 to a direction that is substantially orthogonal to the other end 52 of the electric cable 50. The terminal jig 73 is connected to the other end 52 of the electric cable 50 in the connector main body 71, and a connection end part to be connected to a terminal provided in a fitting hole 81 of the counterpart connector 80 is provided in the fitting cylindrical part 72.

By the above configuration, starting from the one end 51 of the electric cable 50 that is connected to the terminal electrode BE through the conductive plate 40, the electric cable 50 is separated from the side plate 11 gradually in the front-back direction as illustrated in FIG. 2 and FIG. 3. At the same time, in the vertical direction, the electric cable 50 extends to the right along the lower end of the side plate 11 and at an approximately half of the entire length, the electric cable 50 is fixed to the side plate 11 by the fixing member 12.

In a state before the other end 52 (connector 70) is connected to the counterpart connector 80, the electric cable 50 over the fixing member 12 is gradually bent substantially perpendicularly and extends upward gradually toward the side plate 11 and the part near the other end 52 is held by the hook part 30 as illustrated in FIG. 4.

In this state, the electric cable 50 is held by the rib 32A and the inverted tapered part 32B provided to the holding inner wall 31 of the hook part 30. Thus, the electric cable 50 is held in a state where the electric cable 50 from the part that is held by the hook part 30 to the other end 52 is inclined a little to the rear (to the power storage element group BU side) as illustrated in FIG. 4, and inclined a little to the left (to the terminal electrode BE side) as illustrated in FIG. 2, that is, the axial line is inclined a little to the rear left and the other end 52 is positioned above the insulating protector 20. Accordingly, the connector 70 provided to the other end 52 of the electric cable 50 is similarly inclined to the rear left, and as illustrated in FIG. 2, the connector 70 is disposed above the insulating protector 20 such that the fitting cylindrical part 72 is directed obliquely downward.

Note that in the state where the other end 52 (connector 70) of the electric cable 50 is connected to the counterpart connector 80, a part of the electric cable 50 that extends forward from the fixing member 12 is bent by approximately 180 degrees gradually as separating from the side plate 11, and is fitted into the fitting hole 81 of the counterpart connector 80 with the fitting cylindrical part 72 directed downward.

Next, description is made of a procedure of assembling the power storage module 1.

First, the plurality of power storage elements BC is arranged in the front-back direction and the right-left direction, and are fixed collectively by being secured vertically and horizontally by the side plate unit 10. Next, the protector main body 21 of the insulating protector 20 housing the plurality of connection members 60 in advance is attached to the electrode surface BF of the power storage element group BU, and each connection member 60 is fixed to each electrode BP and these are connected in series. Then, the first cover 22A and the second cover 22B are put on the protector main body 21. On the other hand, the conductive cover 43 is put on the conductive plate 40, and the electric cable side connection part 42 is connected to the one end 51 of the electric cable 50, and the connector 70 is attached to the other end 52 of the electric cable 50. Then, a substantially central part of the electric cable 50 is fixed to the side plate 11 with the fixing member 12, and at the same time, the vicinity of the other end 52 is pressed into the hook part 30 of the insulating protector 20 from the left side so as to be surrounded by the holding inner wall 31. Specifically, by having the electric cable 50 sandwiched between the rib 32A and the inverted tapered part 32B, the electric cable 50 is held temporarily. Finally, the electrode side connection part 41 of the conductive plate 40 is connected to the terminal electrode BE, and the third cover 22C is put on the protector main body 21. Thus, the power storage module 1 including a conduction route from the power storage element group BU to the connector 70 is completed.

In order to connect the power storage module 1 to the counterpart connector 80, first, the counterpart connector 80 is placed at a position opposite to the external member opposite region 11A, and the fitting hole 81 provided to open upward in the connector 80 is disposed close to the electrode surface BF. Then, the vicinity of the other end 52 of the electric cable 50 is pulled from the hook part 30 to the left and continuously pulled a little forward until collapsed by approximately 90 degrees, so that the fitting cylindrical part 72 is fitted into the fitting hole 81. Thus, the conductive route from the power storage element group BU to the counterpart connector 80 is formed and therefore, the power storage module 1 and the counterpart connector 80 are electrically connected.

In this configuration, the electric cable 50 is folded back from the one end 51 that is connected to the terminal electrode BE of the power storage element group BU to the other end 52 that is connected to the external member. Therefore, by the folded-back length, the tolerance of the gap between the power storage element group BU and the external member can be absorbed. In the state before the other end 52 of the electric cable 50 is connected to the external member, the electric cable 50 can be held in a state where the other end 52 is inclined to the power storage element group BU; therefore, the workability can be improved.

In addition, the inverted tapered part 32B of the hook part 30 is brought into contact with the electric cable 50 from the side away from the power storage element group BU and away from the terminal electrode BE; therefore, the electric cable 50 can be held in a state where the other end 52 of the electric cable 50 is inclined to the power storage element group BU side and to the terminal electrode BE side.

In addition, just connecting the connector 70 to the external member at the other end 52 of the electric cable 50 enables the power storage element group BU to be connected to the external member; thus, the workability is high.

In addition, in the case where the hook part 30 holds the electric cable 50 in the state where the other end 52 is directed to the power storage element group BU, an intermediate part of the electric cable 50 in the route from the terminal electrode BE to the hook part 30 is inclined to a direction relatively away from the power storage element group BU. On the other hand, in the configuration described above, the electric cable 50 is fixed in a state where the intermediate part of the electric cable 50 in the route from the terminal electrode BE to the hook part 30 is floated by the fixing member 12 forward to a certain degree from the power storage element group BU (side plate 11); thus, the intermediate part that will be deviated to the direction away from the power storage element group BU can be suppressed easily. Accordingly, it is possible to prevent the intermediate part of the electric cable 50 from projecting to the undesired position and the workability can be improved further.

In addition, since the electric cable 50 is bent from the side away from the electrode BP surface to the side closer to the electrode BP surface at the side plate 11, the electric cable 50 can be bent gradually.

<Other embodiments>

The technology described herein is not limited to the embodiment described above with reference to the drawings. The following embodiments may be included in the technical scope.

(1) The hook part 30 provided to the insulating protector 20 is described as the holding part in the above embodiment; however, the holding part is not limited to the hook part 30. For example, the other end side tie band may be provided to the front end part of the protector main body as the holding part, and the vicinity of the other end of the electric cable may be secured thereby. In this case, the fixing member corresponds to a part of the holding part. That is to say, the electric cable is held by the fixing member so as to be separated from the power storage element group once, and then the electric cable is disposed inclined toward the power storage element from the fixing member to the other end side tie band. Therefore, the other end that extends from the other end side tie band is also inclined toward the power storage element group. In this case, by cutting the other end side tie band, the other end side of the electric cable can be detached from the power storage module (that is, the temporarily holding state is canceled), and be attached to the counterpart connector.

(2) In the above embodiment, the other end 52 of the electric cable 50 is inclined to the rear (to the power storage element group BU side) and to the left (to the terminal electrode BE side); however, the electric cable is not necessarily held inclined to the terminal electrode side. For example, the electric cable may be held in a vertical posture in the left-right direction. In short, it is only necessary that the other end of the electric cable is inclined to the power storage element in the state before being connected to the counterpart connector.

(3) In the above embodiment, the intermediate part of the electric cable 50 in the route from the terminal electrode BE to the hook part 30 is fixed by the fixing member 12; however, the fixing member may be omitted if the electric cable will not be separated from the side plate by a predetermined distance or more without the fixing member in the state before the electric cable is connected to the external member.

The invention claimed is:

1. A wiring module configured to connect a power storage element group including at least three power storage elements disposed adjacent to each other and connected in series to each other and to an external member, the wiring module comprising:
   a connection member disposed on surfaces of electrodes of the power storage elements to connect the electrodes of the power storage elements, the electrodes protruding from an electrode surface of the power storage element group in a first direction perpendicular to the electrode surface of the power storage element group;
   an electric cable that includes a first end connected to one of the electrodes located at an end of the power storage element group and defined as a terminal electrode of the power storage element group and a second end to be connected to the external member, the electric cable being folded back from the first end to the second end; and
   an insulating protector that is attached to the electrode surface of the power storage element group to house the connection member, the insulating protector including a holding part that projects in a second direction perpendicular to the first direction to hold the electric cable with the second end of the electric cable inclined toward the electrode surface of the power storage element group,
   wherein:
   the holding part includes a hook part with a cylindrical shape;
   the hook part includes an electric cable attachment/detachment port that opens to a side closer to the terminal electrode, and a holding inner wall with an arc shape that surrounds the electric cable; and
   the holding inner wall includes an inverted tapered part on a side away from the power storage element group and the terminal electrode.

2. The wiring module according to claim 1, further comprising a connector that is coupled to the second end of the electric cable and connected to the external member.

3. The wiring module according to claim 1, wherein
the insulating protector includes a main body disposed over the electrode surface of the power storage element group to house the connection member,
the main body includes an outer plate surface parallel to the electrode surface of the power storage element group and a side surface perpendicular to the outer plate surface, and
the holding part protrudes from the side surface of the main body to hold a section of the electric cable adjacent to the second end of the electric cable with the second end of the electric cable angled toward the outer plate surface of the main body.

4. A power storage module comprising:
the wiring module according to claim 1 that is attached to the electrode surface of the power storage element group;
a side plate that covers a side surface of the power storage element group adjacent to the electrode surface of the power storage element group; and
a fixing member protruding from to the side plate,
wherein the fixing member holds an intermediate part of the electric cable between the first end and the second end of the electric cable.

5. The power storage module according to claim 4, further comprising
a conductive plate extending from the terminal electrode to the first end of the electric cable along the side plate, the conductive plate including:
a first plate end connected to the terminal electrode; and
a second plate end connected to the first end of the electric cable,
wherein the side plate includes an external member opposite region to which the external member is opposed, and
the external member opposite region is between an edge of the side plate adjacent to the electrode surface of the power storage element group and the intermediate part of the electric cable.

6. A wiring module configured to connect a power storage element group including a plurality of power storage elements connected in series to an external member, the wiring module comprising:
a connection member that connects electrodes of a pair of the power storage elements that are adjacent to each other;
an insulating protector that is attached to an electrode surface of the power storage element group where each electrode is disposed, and that houses the connection member;
an electric cable that includes one end to be connected to a terminal electrode of the power storage element group and another end to be connected to the external member, and that is folded back from the one end to the other end; and
a holding part that is provided to the insulating protector, and is configured to hold the electric cable in a state where the other end of the electric cable is inclined toward the power storage element group before the other end of the electric cable is connected to the external member, wherein
the holding part includes a hook part with a cylindrical shape,
the hook part includes an electric cable attachment/detachment port that opens to a side closer to the terminal electrode, and a holding inner wall with an arc shape that surrounds the electric cable, and
the holding inner wall includes an inverted tapered part on a side away from the power storage element group and the terminal electrode.

7. The wiring module according to claim 6, further comprising a connector that is provided to the other end of the electric cable and connected to the external member.

8. A power storage module comprising:
the wiring module according to claim 6 that is attached to the electrode surface of the power storage element group;
a side plate that covers a side surface adjacent to the electrode surface of the power storage element group; and
a fixing member provided to the side plate,
wherein the fixing member fixes an intermediate part of the electric cable in a route from the terminal electrode to the holding part.

9. The power storage module according to claim 8, further comprising a conductive plate that extends from an electrode side connection part connected to the terminal electrode in a direction away from the electrode surface along the side plate, and includes an extension end part corresponding to an electric cable side connection part connected to the one end of the electric cable,
wherein the external member is disposed on a side closer to the electrode surface on the side plate.

10. A power storage module comprising:
a wiring module configured to connect a power storage element group including a plurality of power storage elements connected in series to an external member, the wiring module comprising:
a connection member that connects electrodes of a pair of the power storage elements that is adjacent to each other;
an insulating protector that is attached to an electrode surface of the power storage element group where each electrode is disposed, and that houses the connection member;
an electric cable that includes one end to be connected to a terminal electrode of the power storage element group and another end to be connected to the external member, and that is folded back from the one end to the other end; and
a holding part that is provided to the insulating protector, and is configured to hold the electric cable in a state where the other end of the electric cable is inclined toward the power storage element group before the other end of the electric cable is connected to the external member;
a side plate that covers a side surface adjacent to the electrode surface of the power storage element group;
a fixing member provided to the side plate, wherein the fixing member fixes an intermediate part of the electric cable in a route from the terminal electrode to the holding part; and
a conductive plate that extends from an electrode side connection part connected to the terminal electrode in a direction away from the electrode surface along the side plate, and includes an extension end part corresponding to an electric cable side connection part connected to the one end of the electric cable, wherein the external member is disposed on a side closer to the electrode surface on the side plate.

* * * * *

UNITED STATES PATENT AND TRADEMARK OFFICE
CERTIFICATE OF CORRECTION

| | | |
|---|---|---|
| PATENT NO. | : 11,121,433 B2 | |
| APPLICATION NO. | : 16/248382 | |
| DATED | : September 14, 2021 | |
| INVENTOR(S) | : T. Yanagida et al. | |

It is certified that error appears in the above-identified patent and that said Letters Patent is hereby corrected as shown below:

On the Title Page

Item (73) Assignees, Line 7, please change "KABUSHIK" to -- KABUSHIKI --

In the Claims

Column 9, Line 25 (Claim 4, Line 8), please change "from to the" to -- from the --

Signed and Sealed this
Twenty-sixth Day of July, 2022

Katherine Kelly Vidal
*Director of the United States Patent and Trademark Office*